US008879412B2

(12) United States Patent  
Queseth et al.

(10) Patent No.: US 8,879,412 B2  
(45) Date of Patent: Nov. 4, 2014

(54) ADAPTATION OF CYCLIC SHIFT FOR RANDOM ACCESS PREAMBLES (75) Inventors: Olav Queseth, Solna (SE); Robert Baldemair, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 89 days.

(21) Appl. No.: 13/576,113

(22) PCT Filed: Feb. 3, 2010

(86) PCT No.: PCT/SE2010/050129
§ 371 (c)(1),
(2), (4) Date: Jul. 30, 2012

(87) PCT Pub. No.: WO2011/096858
PCT Pub. Date: Aug. 11, 2011

(65) Prior Publication Data
US 2012/0294185 A1    Nov. 22, 2012

(51) Int. Cl.
*H04L 12/28* (2006.01)
*H04L 12/56* (2006.01)
*H04W 4/00* (2009.01)

(52) U.S. Cl.
USPC ............ 370/252; 370/329; 370/437; 455/446

(58) Field of Classification Search
USPC .......... 370/208–252, 328–336; 455/450–522
See application file for complete search history.

(56) References Cited

U.S. PATENT DOCUMENTS

| | | | |
|---|---|---|---|
| 6,535,547 B1 * | 3/2003 | Lyckegård et al. | 375/145 |
| 8,130,667 B2 * | 3/2012 | Bertrand et al. | 370/252 |
| 8,218,496 B2 * | 7/2012 | Bertrand et al. | 370/330 |
| 8,259,598 B2 * | 9/2012 | Bertrand et al. | 370/252 |
| 8,295,848 B2 * | 10/2012 | Frenger et al. | 455/446 |
| 8,472,308 B2 * | 6/2013 | Xue et al. | 370/208 |
| 2004/0064577 A1 | 4/2004 | Dahlin et al. | |
| 2006/0018336 A1 * | 1/2006 | Sutivong et al. | 370/437 |
| 2008/0075043 A1 * | 3/2008 | Wang et al. | 370/330 |
| 2008/0316961 A1 * | 12/2008 | Bertrand et al. | 370/329 |

(Continued)

FOREIGN PATENT DOCUMENTS

| | | |
|---|---|---|
| WO | WO 2008/052032 A2 | 5/2008 |
| WO | WO 2008/081311 A2 | 7/2008 |

(Continued)

OTHER PUBLICATIONS

International Search Report, PCT Application No. PCT/SE2010/050129, Oct. 25, 2010, 5 pages. (Including Corrected Version).

*Primary Examiner* — Man Phan  
(74) *Attorney, Agent, or Firm* — Myers Bigel Sibley & Sajovec, PA (57) ABSTRACT

The present invention enables automatic configuration of random access parameters. The base station is configured to control PRACH transmission of UEs, wherein the UE PRACH transmission comprises transmission of PRACH preambles constructed of root sequences. This is achieved by storing statistics associated with previous transmissions. A parameter associated with the construction of the PRACH is tuned based on the stored statistics. The base station controls the UE PRACH transmission by transmitting information to the UEs relating to the tuned parameter. This information is used by the UE when constructing the PRACH preambles. In this way, the cell parameters relating to random access can be improved to fit better to individual cells resulting in improved resource usage.

14 Claims, 9 Drawing Sheets

(56) References Cited

U.S. PATENT DOCUMENTS

2009/0073944 A1* 3/2009 Jiang et al. .................... 370/338
2010/0248732 A1* 9/2010 Baldemair et al. ............ 455/450
2011/0158104 A1* 6/2011 Frenger et al. ................ 370/241

FOREIGN PATENT DOCUMENTS

| WO | WO 2009/078785 A1 | 6/2009 |
| WO | WO 2010/002301 A1 | 1/2010 |
| WO | WO 2010/002303 A1 | 1/2010 |

* cited by examiner

ADAPTATION OF CYCLIC SHIFT FOR RANDOM ACCESS PREAMBLES

CROSS-REFERENCE TO RELATED APPLICATION

This application is a 35 U.S.C. §371 national stage application of PCT International Application No. PCT/SE2010/050129, filed on 3 Feb. 2010. The above-referenced PCT International Application was published in the English language as International Publication No. WO 2011/096858 A1 on 11 Aug. 2011. The disclosure of the above-referenced application is hereby incorporated herein in its entirety by reference.

TECHNICAL FIELD

The present invention relates to random access in cellular network and in particular to configuring random access parameters.

BACKGROUND

In existing cellular radio systems, the radio network has a strict control on the behavior of the user equipment (UE). Uplink transmission parameters like frequency, timing, and power are regulated via downlink control signaling from the base station, also referred to as an eNodeB in Long Term Evolution, to the UE.

Figure 1:
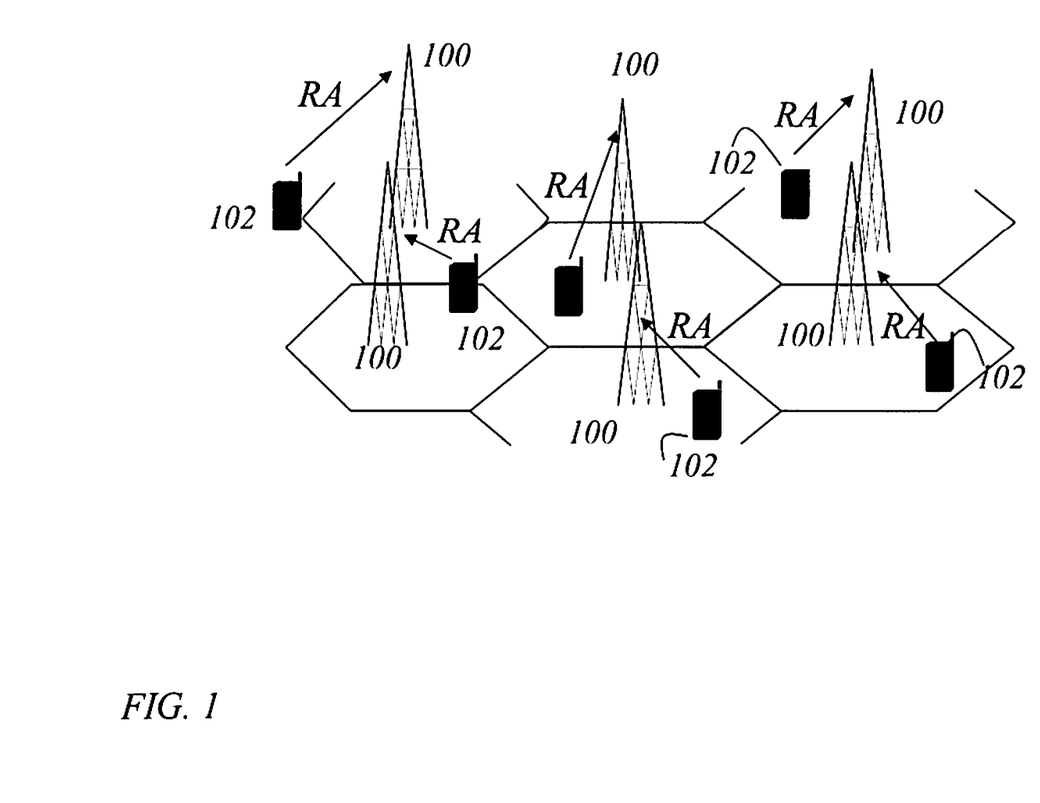
FIG. 1 illustrates a cellular system wherein the embodiments of the present invention may be implemented.

At power-on or after a long standby time, the UE is not synchronized in the uplink. The UE can derive an uplink frequency and power estimate from the downlink (control) signals. However, a timing estimate is difficult to make since the round-trip propagation delay between the eNodeB and the UE is unknown. So even if UE uplink timing is synchronized to the downlink, it may arrive too late at the eNodeB receiver because of the propagation delays. Therefore, before commencing traffic, the UE has to carry out a Random Access (RA) procedure to the network as illustrated in FIG. 1.

Random access (RA) is the process for the UE to request a connection setup for initial access or to re-establish a radio link. In addition to the usage of RA during initial access, RA is also used when the UE has lost the uplink synchronization in an idle or a low-power mode. Also during a handover process, the RA may be used to setup a connection between the UE and the new base station.

When the UE has transmitted the RA, the eNodeB can estimate the uplink timing misalignment of the UE and send a correction message. During the RA, uplink parameters like timing and power are not very accurate. This poses extra challenges to the dimensioning of a RA procedure.

Usually, a Physical Random Access Channel (PRACH) is provided for the UE to request access to the network. An Access Burst (AB) is used which contains a preamble with a specific sequence with good Auto-Correlation (AC) properties. The PRACH can be orthogonal to the Traffic Channels (TCH). Because multiple UEs can request access at the same time, collisions may occur between requesting UEs. A contention resolution scheme has to be implemented to separate the UE transmissions.

To distinguish between different UEs performing RA typically many different preambles exist. A UE performing RA randomly picks a preamble out of a pool and transmits it. The preamble represents a random UE ID (UE Identity) which can be used by the eNodeB when granting the UE access to the network. The eNodeB receiver can resolve RA attempts performed simultaneously with different preambles and send a response message to each UE using the corresponding random UE IDs. In case that multiple UEs simultaneously use the same preamble a collision occurs and most likely the RA attempts are not successful since the eNodeB cannot distinguish between the two users with the same random UE ID.

In Long Term Evolution (LTE) one or multiple preambles can be derived from a Zadoff-Chu or root sequence. Zadoff-Chu sequences are so called Constant Amplitude Zero Auto Correlation (CAZAC) sequences. This implies a constant magnitude and a perfect periodic auto-correlation function, i.e. the correlation has a single peak at time-lag zero and vanishes everywhere else. This property can now be used to derive multiple preambles from a singe root sequence.

One design goal for LTE has been to create as many unique PRACH preambles as possible. There are 838 root sequences available. To increase the number of available sequences each root sequence can be cyclically shifted (in time) to create more unique sequences. The total number of unique sequences becomes the product of the number of root sequences and the number of cyclic shifts.

The number of possible cyclic shifts is determined by the cell size. The cyclic shift has to be larger in time than the longest propagation delay in the cell plus the largest expected delay spread. The longest propagation delay is dictated by the geographical size of the cell. Thus for larger cells the number of available shifts is less than for small cells, which means that for larger cells the amount of unique preambles becomes less.

In each cell 64 preambles out of the total set are provided. For small cells a few root sequences are used together with short cyclic shifts, in very small cells even a single root sequence is sufficient. Since the needed cyclic shifts are short, there are many possible cyclic shifts and the number of root sequences that needs to be used becomes small since the product of cyclic shifts and number of used root sequences should be at least 64. For larger cells more root sequences are used since there are not so many cyclic shifts possible for each root sequence. Exactly which preambles that are in use in a cell is signaled to the UEs on the broadcast channel.

One constraint for assigning root sequences to the cells is that they should be unique, i.e the same root sequences should not be assigned to the cells close by.

Planning the use of root sequences in a cellular network is a non-trivial task. The number of root sequences used by a cell should be minimized since this allows for larger reuse distance, i.e. the distance between cells that use the same root sequences can be increased. However reducing the number of root sequences used by a cell implies reducing the length of the cyclic shift. However the length of the cyclic shift depends on the size of the cell and it cannot be reduced too much.

Given the irregular shape of cells in practical deployments and variable propagation conditions the planning of PRACH preambles is today done manually.

All preambles derived via cyclic shifting from a single root sequence are orthogonal to each other. Preambles derived from different root sequences are not orthogonal to each other but interfere to other root sequences (and preambles derived thereof via cyclic shifting). Increased interference results in a higher false alarm rate which in turn requires a higher threshold if the false alarm rate should be maintained, leading to a worse missed detection performance. False alarm rate implies that the eNodeB believes that it has found a radio access attempt when it was noise plus interference. The standard governs how high this false alarm rate is allowed to be. In case of higher noise plus interference a higher threshold is needed to maintain this false alarm rate. A higher threshold means that the detected peak must be higher, so the likelihood that true peaks are missed increases.

Yet another reason to keep the number of root sequences used in a cell as small as possible is complexity in the eNodeB. In an eNodeB receiver all preambles derived from a single root sequence can be detected with a single correlator. Preambles derived from another root sequence require an additional correlator, i.e. the number of correlator increase linearly with the number of root sequences used in the cell.

Manual configuration is cumbersome, error prone and costly. A manual configuration would typically not go down to each individual cell but use default configuration values for a whole region. Since these default parameters must work for all cells the values are typically chosen conservative and far from being optimized for individual cells resulting in the problems outlined above.

SUMMARY

Thus an object with the present invention is to provide a solution for automatic configuration of random access parameters.

This is achieved by using stored statistics associated with previous transmissions for tuning a parameter that is associated with the construction of the random access parameters.

According to a first aspect of the present invention, a method in a base station for controlling PRACH transmission of UEs is provided. The PRACH transmission comprises transmission of PRACH preambles constructed by root sequences. In the method, statistics associated with previous transmissions is stored and a parameter associated with the construction of the PRACH is tuned based on the stored statistics. Further, information is transmitted to the UEs relating to the tuned parameter to be used by the UEs for sending PRACH preambles.

According to a second aspect of the present invention, a base station for controlling PRACH transmission of UEs is provided. The PRACH transmission comprises transmission of PRACH preambles constructed by root sequences. The base station comprises a memory for storing statistics associated with previously transmissions, a processor for tuning a parameter associated with the construction of the PRACH based on the stored statistics, and a transmitter for transmitting information to the UEs relating to the tuned parameter to be used by the UEs for sending PRACH preambles.

An advantage with embodiments of the present invention is that it offers automatic tuning of PRACH parameters which makes manual setup unnecessary. The automatic procedure leads to parameter setting tailored to each individual cell thus avoiding above outlined drawbacks. A manual configuration typically does not lead to an optimal parameter setting for a cell since most likely conservative parameters are used. Not using optimal parameters reduces the reuse factor of root sequences and negatively influences detection performance.

DETAILED DESCRIPTION

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The embodiments of the present invention can be implemented in a cellular network, where the uplink UE behaviour is controlled by the network and an unsynchronized uplink communication session is initiated by a random access procedure. An example of such a network is illustrated in FIG. 1, which is exemplified by an LTE network. The network of FIG. 1 illustrates base stations 100 receiving random access (RA) requests from UEs 102. It should however be understood that the present invention is not limited to LTE networks.

Figure 4A:
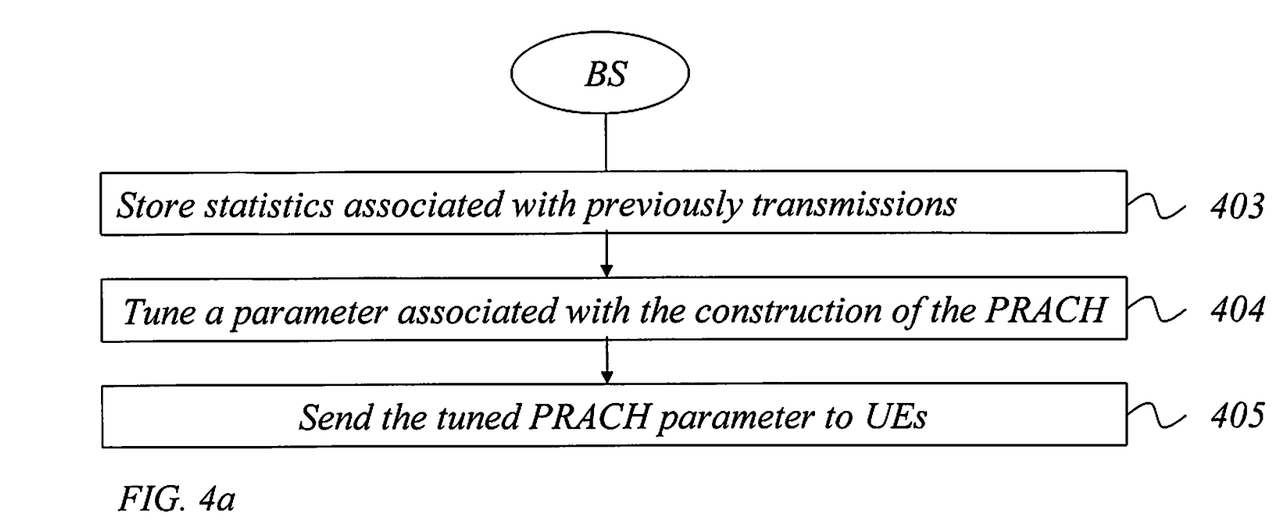
FIGS. 4-5 are flowcharts of the method according to embodiments of the present invention.

The embodiments of the present invention enables automatic configuration of random access parameters. The base station is thus configured to control PRACH transmission of UEs, wherein the UE PRACH transmission comprises transmission of PRACH preambles constructed of root sequences. This is achieved as illustrated in the flowchart of FIG. 4a by storing 403 statistics associated with previous transmissions. A parameter associated with the construction of the PRACH is tuned 404 based on the stored statistics. The base station controls the UE PRACH transmission by transmitting 405 information to the UEs relating to the tuned parameter. This information is used by the UE when constructing the PRACH preambles. In this way, the cell parameters relating to random access can be improved to fit better to individual cells resulting in improved resource usage.

The present invention provides two embodiments that can be used for automatically tuning the PRACH parameters.

According to a first embodiment the basic cyclic shift length is auto tuned. All cyclic shifts are derived from this basic cyclic shift length, which is for the unrestricted random access set the time difference between two consecutive cyclic shifts. The unrestricted random access set is defined in the Long Term Evolution standard specification TS 36.211 section 5.7.2, where the basic cyclic shift length is denoted N_CS. In case of unrestricted random access set the cyclic shift is generated according to v*N_CS and in case of restricted random access sets the formula is more complicated, one root sequence cannot deliver as many cyclic shifts as in the unrestricted case. When the UE has knowledge of the basic cyclic shift length, the UE can then derive the cyclic shift $C\_v$ according to $C\_v=v*N\_CS$. The cyclic shift difference between two preambles using $v=n$ and $v=n+1$ or the "length" of one cyclic shift is then $N\_CS$. v depends on which of the 64 preambles that is used. In case that the restricted random access set is used the cyclic shift difference between two consecutive cyclic shifts depends on $N\_CS$ but is not necessarily $N\_CS$.

As mentioned above, the number of possible cyclic shifts is determined by the cell size. The cyclic shift has to be larger in time than the longest round-trip delay in the cell plus the largest expected delay spread. The longest round-trip delay is dictated by the geographical size of the cell. Thus for larger cells the number of available shifts are less than for small cells, which means that for larger cells the amount of unique preambles becomes less. This is illustrated in FIG. 2b.

Figure 2A:
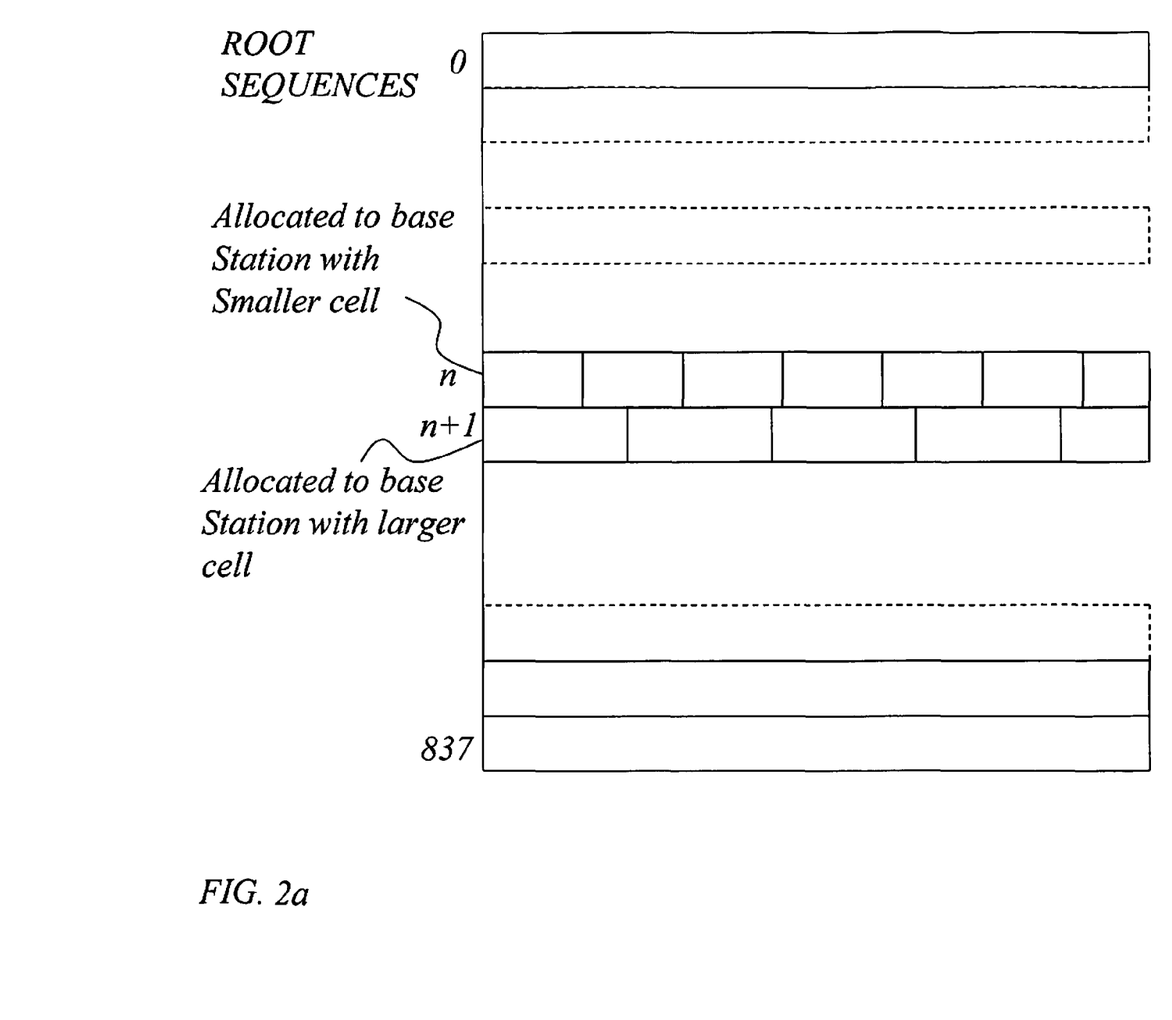
FIG. 2a illustrates cyclic shifts of the root sequences.
Figure 2B:
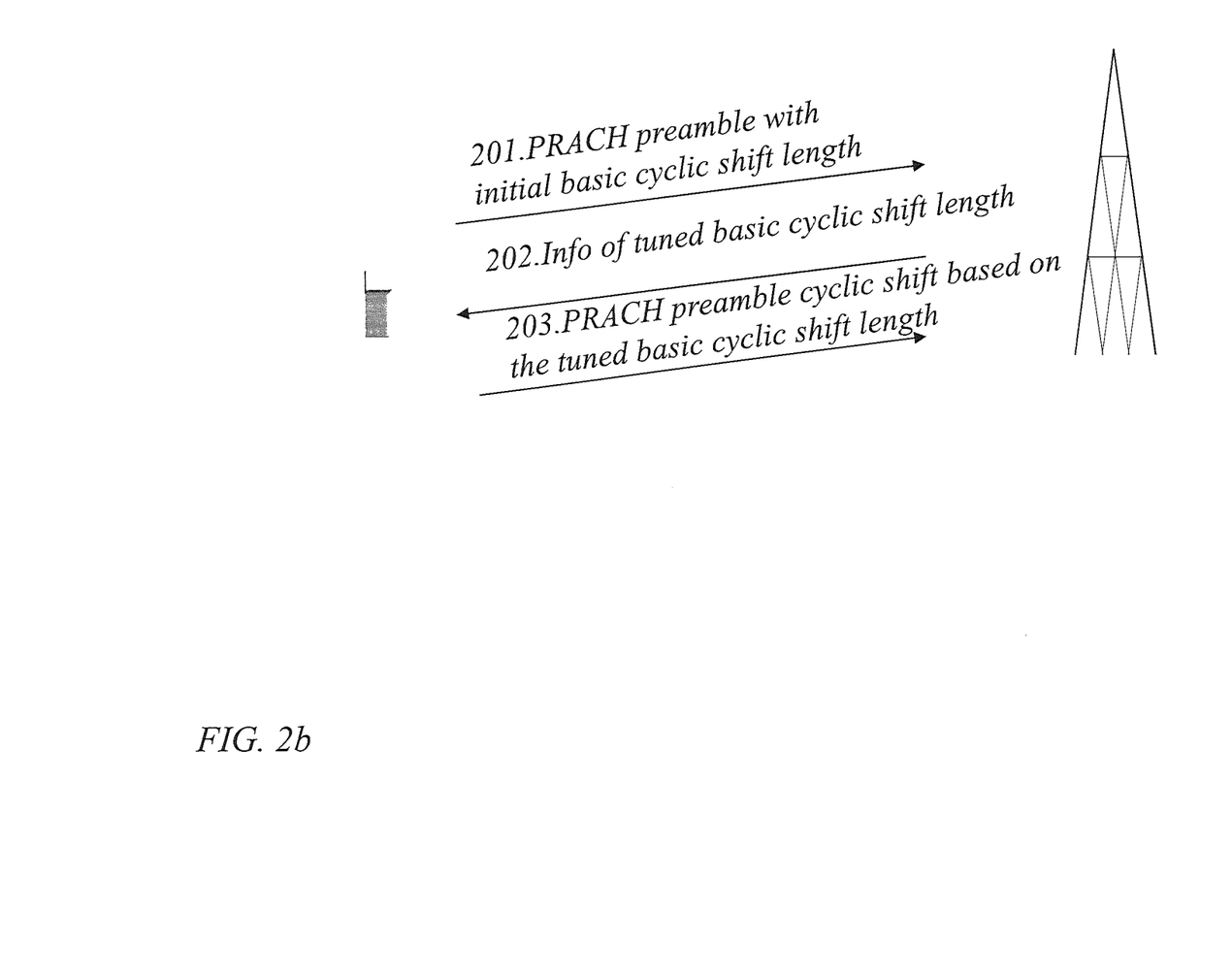
FIG. 2b illustrates a scenario according to the first embodiment, where the basic cyclic shift length is tuned.

Initially, the length of the basic cyclic shift is set 201 to a large value in the cell as illustrated in FIG. 2b. However, whenever a UE sends a preamble to the base station, the base station can determine the round-trip delay between the UE and the base station. The base station then keeps statistics of the round-trip delay for the UEs that has camped in the cell or accessed it. The basic cyclic shift length used in the cell can then be tuned based on the statistics of the round-trip delays in the cell and the tuned basic cyclic shift length is transmitted 202 to the UEs such that the UEs can use 203 the tuned PRACH parameters which in this case is the basic cyclic shift length. According to one embodiment, the determination of the basic cyclic shift length is performed by determination of the maximum round-trip delay in the cell and the basic cyclic shift length is reduced to this value or slightly above this value to also consider a delay spread.

Alternatively the basic cyclic shift length is determined such that x % of all stored round-trip delays are smaller than the basic cyclic shift length. The number x is typically chosen very close to 100%, e.g. 99%. This is exemplified in FIG. 7, where x is set to 99%. Hence, in FIG. 7 the size of the cell is designed for RTT99, i.e. that 99% of all stored RTT (Round trip time) delays are smaller than the basic cyclic shift length, so most measured RRTs will have 0<rtt<RTT99 as indicated by 702.

Figure 7:
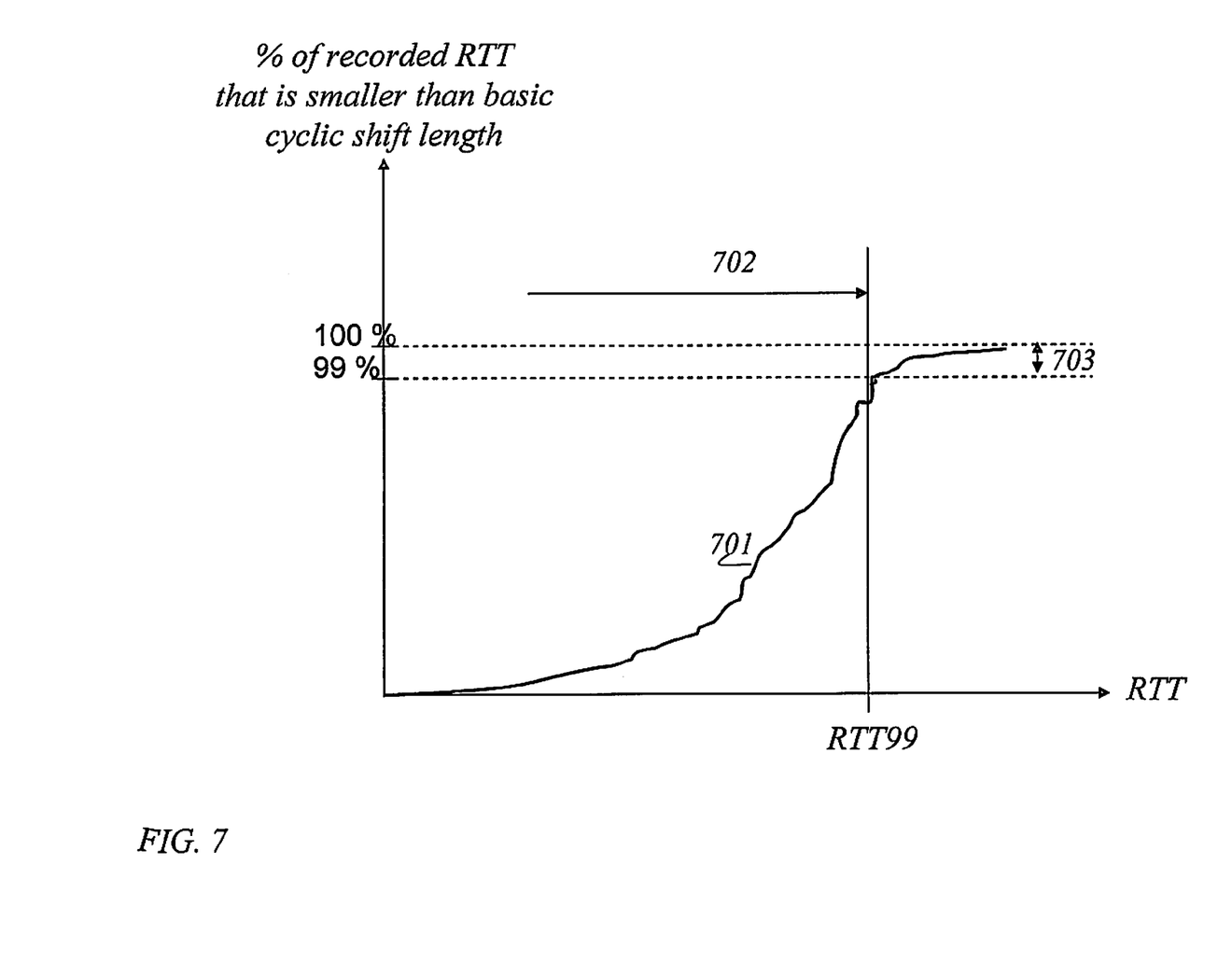
FIG. 7 illustrates how to determine the round trip time according to an alternative of the first embodiment of the present invention.

Setting x to 100% means that all stored values are smaller than the "found value", i.e. the found value is the maximum of all stored round trip delays. Setting this value to something very high, e.g. 99% or 99.9% a few values 703 are excluded, e.g. if a terminal connects to one cell but actually is closer to another cell and should connect to the other cell this value is excluded. x could either be fixed or it may even depend on the shape of the curve 701. An advantage with this alternative is that smaller RTTs will be obtained, resulting in smaller basic cyclic shift length and accordingly a better reuse of the root sequences.

Hence, the parameter associated with the construction of the PRACH is according to the first embodiment a basic cyclic shift length of a root sequence used for PRACH preamble and the transmitted information to the UEs is the basic cyclic shift length.

Figure 5:
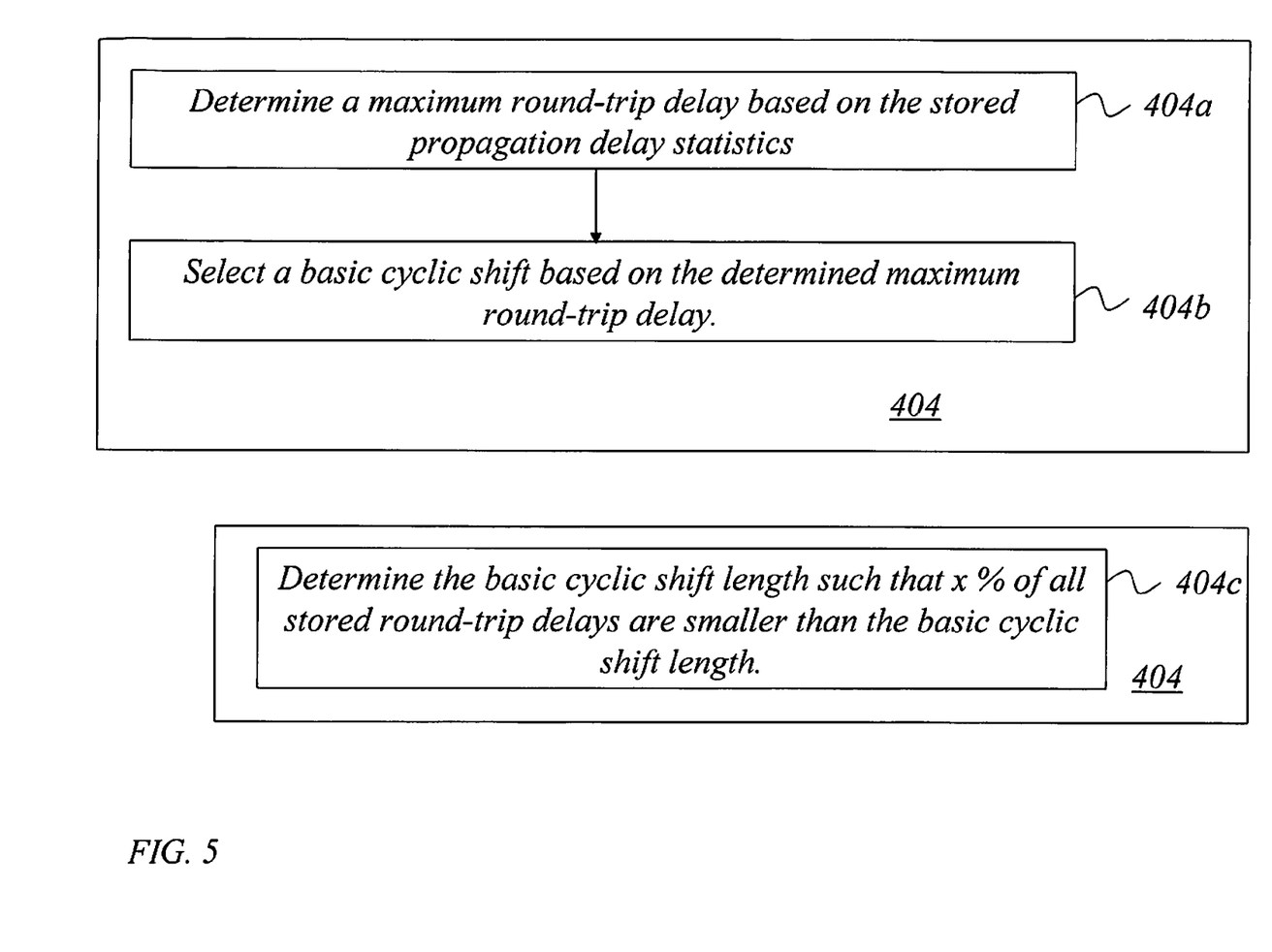

Moreover, according to the first alternative of the first embodiment, the tuning step comprises as illustrated in FIG. 5 that a maximum round-trip delay is determined 404a based on the stored round-trip delay statistics, and that a basic cyclic shift length is selected 404b based on the determined maximum round-trip delay. According to the second alternative of the first embodiment, the tuning step comprises as illustrated in FIG. 5 that the basic cyclic shift length is determined 404c such that x % of all stored round-trip delays are smaller than the basic cyclic shift length.

Figure 4B:
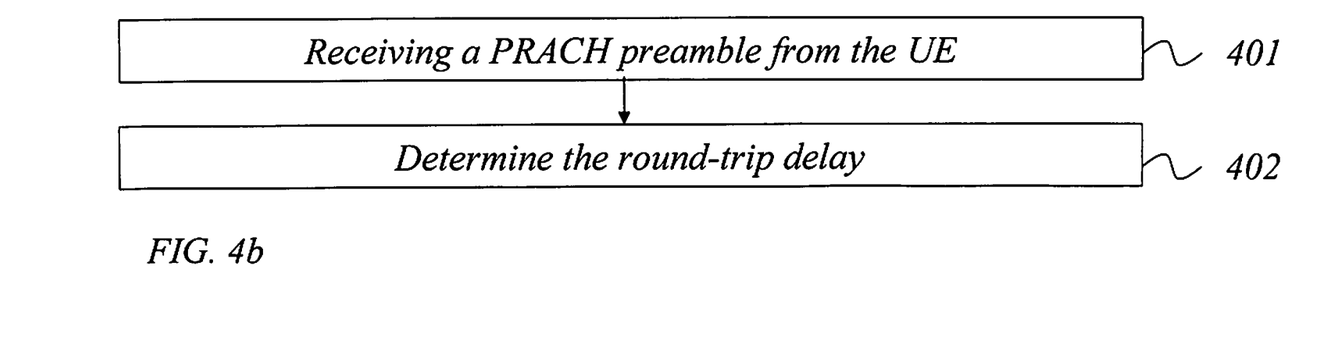

It should be noted that the round-trip delay which is stored as the statistics may be determined based on received PRACH preambles. This is illustrated in the flowchart of FIG. 4b where a PRACH preamble is received from the UE in step 401, and the round-trip delay is determined based on the received PRACH preamble in step 402.

Figure 3A:
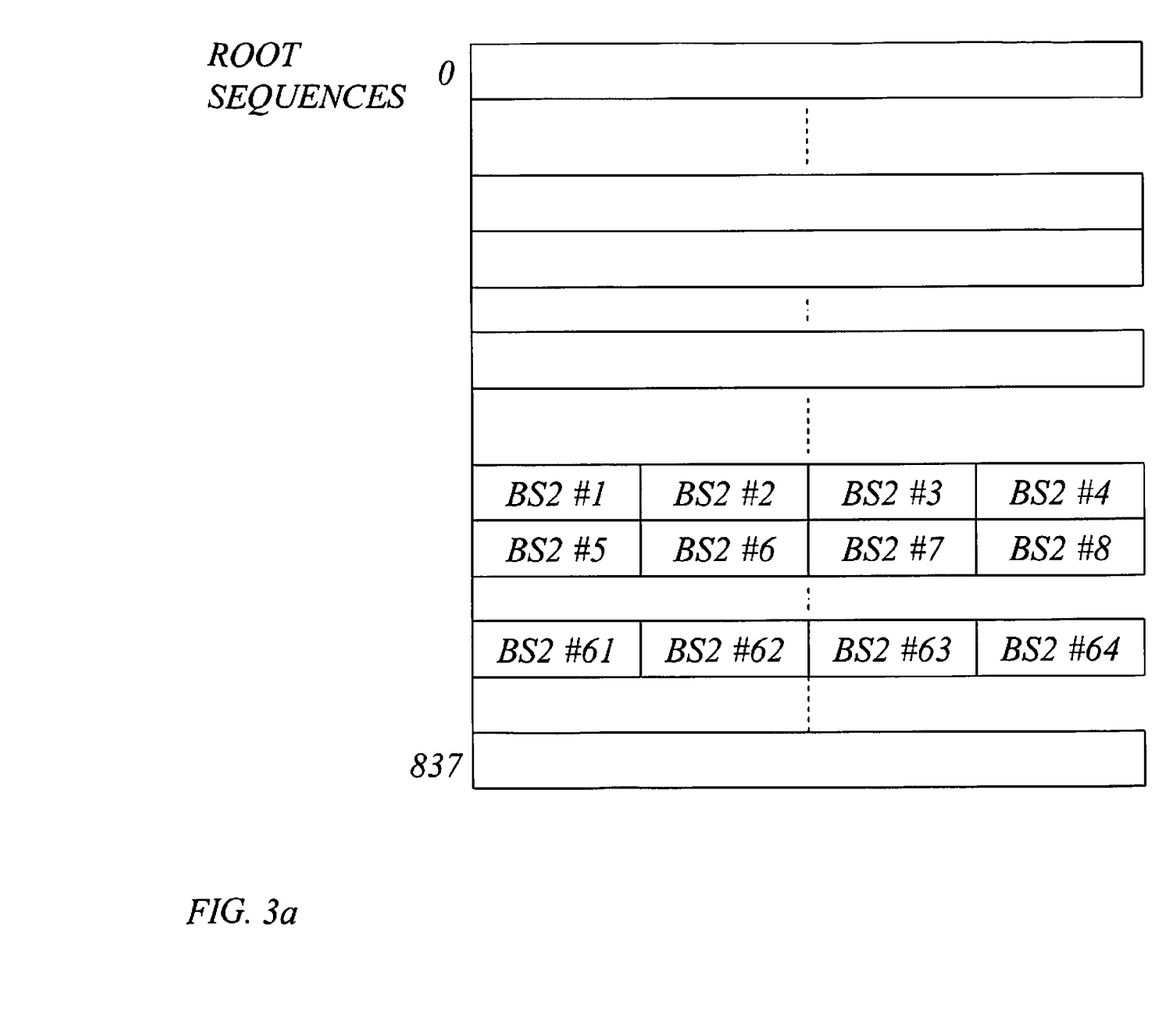
FIG. 3a illustrates allocation of root sequences.
Figure 3B:
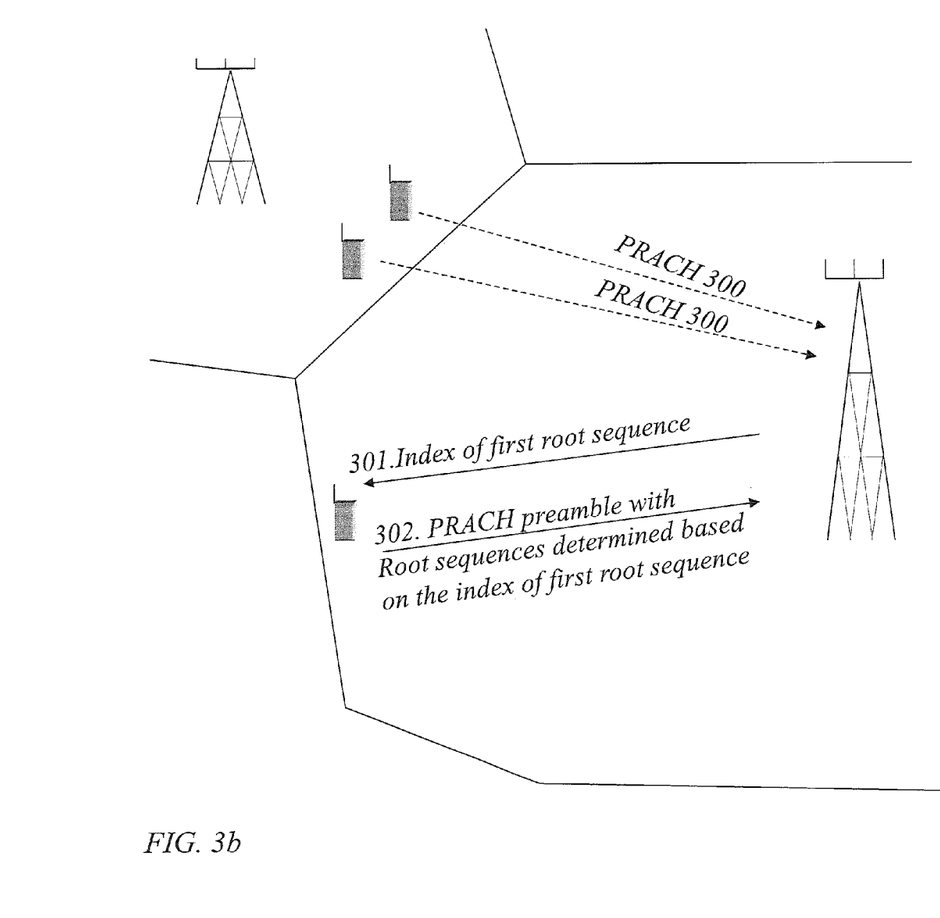
FIG. 3b illustrates a scenario according to the second embodiment, where the root sequence is selected based on the stored statistics.

According to a further embodiment, a base station can detect preambles from UEs in neighboring cells and thus the root sequences used in the neighboring cells. The UEs at the borders of a cell will also use the root sequences of the neighboring cells when attempting to access neighboring cells. By storing statistics of root sequences relating to root sequences used for PRACH preamble which are heard from neighboring cells the base station can select a root sequence range that is not colliding with the neighboring cells. There are several methods for selecting the root sequences. For example it is possible to select randomly, the first free root sequences, the least interfered root sequence. FIG. 3a illustrates a possible allocation of root sequences and FIG. 3b illustrates that a base station has detected preambles from UEs in a neighboring cell. From the detected preambles, the base station can then determine which root sequences that are used in the neighboring cell. Based on that, the base station tunes a parameter associated with the construction of the PRACH, wherein the parameter in this embodiment is the root sequence to be used for the PRACH preamble and that the base station is sending 301 the index of the first available root sequence to the UEs, i.e. the first root sequence according to a standardized order available in the cell.

Depending on the cell size a cell has one or multiple root sequences assigned to it. In order to avoid excessive signaling the root sequences are ordered in a way known to both the base station and the terminal. Instead of transmitting the indices of all root sequences assigned to a cell it is now sufficient to only signal the index of the first root sequences. Based on the index of the first root sequence together with the sorting order the UE can derive all root sequences assigned to a cell. In that way, the UEs will use 302 preambles constructed of root sequences which do not collide with the root sequences used in the neighboring cell.

Figure 6:
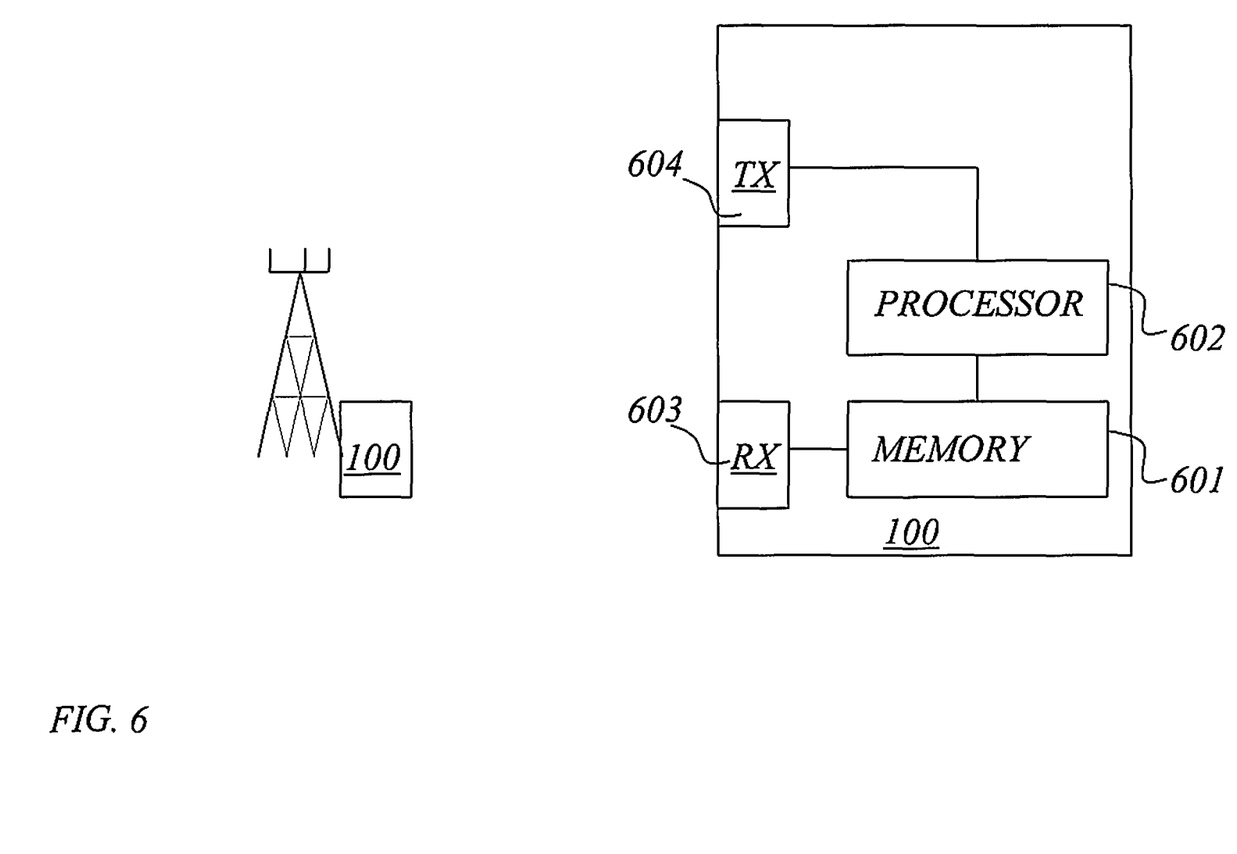
FIG. 6 illustrates a base station according to embodiments of the present invention.

Turning now to FIG. 6, illustrating a base station 100 for controlling PRACH transmission of UEs wherein the PRACH transmission comprises transmission of PRACH preambles constructed by root sequences. The base station comprises a memory 601 for storing statistics associated with previously transmissions. The base station further comprises a processor 602 for tuning a parameter associated with the construction of the PRACH based on the stored statistics, and a transmitter 604 for transmitting information to the UEs relating to the tuned parameter to be used by the UEs for sending PRACH preambles.

As described above in conjunction with the first embodiment, the stored statistics comprises statistics relating to round-trip delay between the UEs and the base station, the parameter associated with the construction of the PRACH is a basic cyclic shift length of a root sequence used for PRACH preamble and the transmitted information is the basic cyclic shift length according to the first embodiment. Further, according to this embodiment, the processor 602 is configured to determine a maximum round-trip delay based on the stored round-trip delay statistics, and to select a basic cyclic shift length based on the determined maximum round-trip delay. The processor 602 may also be configured to determine the basic cyclic shift length such that x % of all stored round-trip delays are smaller than the basic cyclic shift length as explained more above.

In addition, the round-trip delay may be determined from received PRACH preambles. Accordingly, the base station comprises a receiver 603 for receiving a PRACH preamble from the UE and the processor 602 is further configured to determine the round-trip delay based on the received PRACH preamble according to an embodiment.

According to the second embodiment, the stored statistics comprises statistics relating to root sequences used for PRACH preamble in neighbouring cells. In this case, the tuned parameter associated with the construction of the PRACH is the root sequence to be used for the PRACH preamble such that root sequence used for the base station does not collide with root sequences of neighboring cells.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a base station for controlling Physical Random Access Channel (PRACH) transmission of user equipments (UEs), wherein the PRACH transmission comprises transmission of PRACH preambles constructed by root sequences, comprising:
storing statistics associated with previous transmissions;
tuning a parameter associated with construction of the PRACH based on the stored statistics; and
transmitting information to the UEs relating to the tuned parameter to be used by the UEs to send the PRACH preambles,
wherein the stored statistics comprise statistics relating to root sequences used for a PRACH preamble in neighboring cells, and
wherein the tuned parameter associated with the construction of the PRACH comprises a root sequence to be used for the PRACH preamble such that root sequences used for the base station do not collide with the root sequences of the neighboring cells.

2. The method according to claim 1, wherein the stored statistics comprise statistics relating to round-trip delay between the UEs and the base station.

3. The method according to claim 2, wherein the parameter associated with the construction of the PRACH comprises a basic cyclic shift length of the root sequence used for the PRACH preamble and the transmitted information comprises the basic cyclic shift length.

4. The method according to claim 2, wherein tuning comprises:
determining a maximum round-trip delay based on the stored round-trip delay statistics; and
selecting a basic cyclic shift length based on the determined maximum round-trip delay.

5. The method according to claim 3, wherein tuning comprises:
determining the basic cyclic shift length such that a percentage of all stored round-trip delays are smaller than the basic cyclic shift length.

6. The method according to claim 2, further comprising:
receiving the PRACH preamble from one of the UEs; and
determining the round-trip delay based on the received PRACH preamble.

7. The method according to claim 1, wherein the transmitted information comprises an index of a first available root sequence.

8. A base station configured to control Physical Random Access Channel (PRACH) transmission of user equipments (UEs),
wherein the PRACH transmission comprises transmission of PRACH preambles constructed by root sequences,
wherein the base station comprises:
a memory configured to store statistics associated with previous transmissions;
a processor configured to tune a parameter associated with construction of the PRACH based on the stored statistics; and
a transmitter configured to transmit information to the UEs relating to the tuned parameter to be used by the UEs to send the PRACH preambles,
wherein the stored statistics comprise statistics relating to root sequences used for a PRACH preamble in neighboring cells, and
wherein the tuned parameter associated with the construction of the PRACH comprises a root sequence to be used for the PRACH preamble such that root sequences used for the base station do not collide with the root sequences of the neighboring cells.

9. The base station according to claim 8, wherein the stored statistics comprise statistics relating to round-trip delay between the UEs and the base station.

10. The base station according to claim 9, wherein the parameter associated with the construction of the PRACH comprises a basic cyclic shift length of the root sequence used for the PRACH preamble and the transmitted information comprises the basic cyclic shift length.

11. The base station according to claim 9, wherein the processor is further configured to determine a maximum round-trip delay based on the stored round-trip delay statistics, and to select a basic cyclic shift length based on the determined maximum round-trip delay.

12. The base station according to claim 9, wherein the processor is further configured to determine a basic cyclic shift length such that a percentage of all stored round-trip delays are smaller than the basic cyclic shift length.

13. The base station according to claim 9, further comprising a receiver configured to receive the PRACH preamble from one of the UEs and the processor is further configured to determine the round-trip delay based on the received PRACH preamble.

14. The base station according to claim 8, wherein the transmitted information comprises an index of a first available root sequence.

* * * * *

UNITED STATES PATENT AND TRADEMARK OFFICE
CERTIFICATE OF CORRECTION

PATENT NO. : 8,879,412 B2  Page 1 of 1
APPLICATION NO. : 13/576113
DATED : November 4, 2014
INVENTOR(S) : Queseth et al.

It is certified that error appears in the above-identified patent and that said Letters Patent is hereby corrected as shown below:

In the Specification

In Column 2, Line 13, delete "singe root" and insert -- single root --, therefor.

In Column 5, Line 3, delete "untrestricted" and insert -- unrestricted --, therefor.

Signed and Sealed this
Fourteenth Day of July, 2015

Michelle K. Lee
*Director of the United States Patent and Trademark Office*